United States Patent
Pryor et al.

[15] 3,670,086

[45] June 13, 1972

[54] INJECTABLE TETRAMISOLE COMPOSITIONS

[72] Inventors: David Ernest Pryor, Balwyn, Victoria; Bruce Adam Forsyth, Croydon, Victoria, both of Australia

[73] Assignee: Imperial Chemical Industries of Australia and New Zealand Limited, Melbourne, Victoria, Australia

[22] Filed: July 13, 1970

[21] Appl. No.: 54,642

[30] Foreign Application Priority Data

July 21, 1969 Australia ...........................58311/69

[52] U.S. Cl. ............................................................424/270
[51] Int. Cl. .....................................................A61k 27/00

[58] Field of Search.................................................424/270

[56] References Cited

OTHER PUBLICATIONS

Merck Index – Eighth edit. (1968) page 1,029

*Primary Examiner*—Sam Rosen
*Attorney*—Cushman, Darby & Cushman

[57] ABSTRACT

Aqueous injectable solutions of tetramisole which comprise tetramisole citrate, tartrate, or phosphate equivalent to at least 6 percent w/v of L-tetramisole base, the pH of the solution being adjusted to the range of from 2 to 4 by addition of tartaric, citric or phosphoric acid.

8 Claims, No Drawings

INJECTABLE TETRAMISOLE COMPOSITIONS

This invention relates to new formulations of tetramisole; in particular it relates to formulations which are suitable for administration by injection into warm-blooded animals, e.g. cattle, pigs, sheep or fowl. It is known from British Pat. No. 1,043,489 — Janssen Pharmaceutica N.V. that D,L-2,3,5,6-tetrahydro-6-phenylimidazo-(2,1-b)-thiazole (for convenience hereinafter referred to as D,L-tetramisole) and its therapeutically acceptable acid addition salts are potent anthelmintic agents. The said specification Brit. Pat. No. 1,043,489 enumerates many acid addition salts of D,L-tetramisole derived from common organic and inorganic acids. It is also known that laevorotatory tetramisole, hereinafter referred to as L-tetramisole, is approximately twice as active as D,L-tetramisole as an anthelmintic agent, i.e. that L-tetramisole is responsible for all or most of the anthelmintic activity, at least in ruminants such as sheep or cattle. In our Australian Pat. application No. 32285/68 we have disclosed and claimed a process for preparing L-tetramisole in highly pure form. Since the mammalian tolerance to dextrorotatory tetramisole (hereinafter referred to as D-tetramisole) is approximately equal to the tolerance of L-tetramisole, the manufacture of pure L-tetramisole made it possible to substantially reduce the risk of toxic reaction in the host animal. Although the D,L-tetramisole racemate itself has a wide safety margin for most species, the practically doubled safety margin of the L-isomer has great value when it is administered under varying control in the field, particularly under the extremes of conditions of sheep- and cattle-farming in the Australian outback or in the open ranges in the U.S.A., where prolonged drought may unpredictably reduce the resistance of individual animals. Furthermore, preparation of pure L-tetramisole facilitated administration by subcutaneous injection since lower dosages are required.

In spite of the fact that tetramisole can be administered "per os," administration by injection is a desirable objective. Cattle, particularly wild range cattle, resist the administration of drugs "per os" and complex harnessing equipment is required for satisfactory handling. The administration of the drug to cattle by injection is far simpler, permits the dosing of many more animals per unit of time and involves far less risk to man and animal; even with sheep, pigs or poultry, injection is at times preferable. However, the administration of tetramisole solutions by injection has not proved entirely satisfactory. With cattle the therapeutic dose injected is proportional to body weight and therefore relatively large. A very small proportion of the animals exhibits sensitivity and even undesirable pathological reactions at the site of injection varying from mild irritation to the formation of lumps, which may range in diameter from several millimeters up to several centimeters.

Although the statistical incidence of this phenomenon is extremely low it has up to date prevented the adoption of administration by injection in many areas and the elimination of this phenomenon remains therefore highly desirable. In the widespread application of tetramisole in many countries, almost universally, its halide, particularly its chloride salts have been used for aqueous formulations, mostly with small additions of phosphate or citrate buffer, usually less than 0.03 mol/liter, to control the pH to somewhat less than the normal pH of the hydrochloride, which is at about 4. This pH adjustment has been made solely for the purpose of improving the storage stability of the solutions, since tetramisole undergoes base-catalysed hydrolysis to an inactive derivative.

The pathological sensitivity observed with certain animals after injection of the hydrochloride has hitherto been ascribed to idiosyncratic reactions to the organic tetramisole molecule, e.g. irritancy or histaminic releases.

For this reason considerations of biological acceptability, particularly acceptability for injections, hitherto have concentrated on the effect of the tetramisole molecule or analogues thereof.

We have now found that the requirements for therapeutic acceptability of tetramisole salts for injection differs from those for administration "per os." In particular we have discovered that the anion of the tetramisole salt in the solution affects the living tissue to varying degrees. While we do not wish to be limited by theory we consider that osmotic and/or electro-osmotic effects in certain sensitive animals can provide the driving force to damage in the cell walls and that this can be remedied by the selection of a suitable anion for the tetramisole salt.

We have found furthermore that a measure of the therapeutic acceptability for injections of aqueous tetramisole addition salt solutions can be obtained by a simple haemolysis test. When one of the tetramisole salts which is less acceptable for subcutaneous injection is mixed with bovine blood under standard conditions, a proportion of the red blood cells undergoes haemolysis, and blood serum becomes colored to a degree varying with the degree of haemolysis. No or very little such haemolysis is observed with salts acceptable for injection. If the red blood cells are then removed by centrifugation of the solution, the residual color of the blood serum is a quantitative measure of the haemolysis. While we do not know whether some haemolysis may occur in vivo in the tissue of the animal or whether haemolysis in blood exhibited in the in vitro test is merely a phenomenon correlated to the damage of tissue in vivo, we have found that the degree of haemolysis is correlated significantly with the occurrence of sensitivity to injections in those live animals which exhibit sensitivity to tetramisole hydrochloride injections.

Accordingly we provide an aqueous solution of an amount of a tetramisole salt equivalent to at least 6 percent w/v of L-tetramisole base, which solution when mixed with bovine blood and subjected to the haemolysis test hereinafter defined, does not produce haemolysis to an extent exceeding the rating S of said haemolysis test.

HAEMOLYSIS TEST

The test is carried out on heparinised venous blood drawn either from individual animals or, preferably, on a bulked representative sample from a number of the animals to be subsequently injected.

Procedure

Into a series of centrifuge tubes of at least 10 cc capacity, pipette 2 ml of the aqueous solution of the tetramisole salt to be tested, add quickly with agitation 4 ml of whole heparinised venous blood and place the centrifuge tube in a water-bath at 38° C for 20 minutes. Immediately centrifuge at a force at least 1,500 G s to throw down the red cells and compare the color of the supernatant plasma with a series of standards prepared as follows:

Solution 1

Prepare a batch of bovine serum preferably from the same blood by centrifuging unhaemolysed blood as described above.

Solution 2

Prepare haemolysed blood by diluting 4 vols of blood with 2 vols of 15 percent w/v tetramisole hydrochloride. Hold at 38° C for 20 minutes.

Prepare standards by mixing solutions 1 and 2 in the ratios shown below.

| Haemolysis Rating | | Mixture | |
|---|---|---|---|
| | | mls soln. 1 | mls soln. 2 |
| 0 | acceptable | 10 | 0 |
| S | | 9.95 | 0.05 |
| 1 | | 9.9 | 0.1 |
| 2 | | 9.75 | 0.25 |
| 3 | | 9.0 | 1.0 |
| 4 | not | 7.5 | 2.5 |
| 5 | acceptable | 6.0 | 4.0 |
| 6 | | 4.5 | 5.5 |
| 7 | | 3.0 | 7.0 |
| 8 | | 1.5 | 8.5 |
| 9 | | 0.5 | 9.5 |
| 10 | | 0 | 10 |

A rating of zero corresponds to no haemolysis, and S to negligible effect; these ratings characterize the salts of the present invention. Ratings from 1 to 10 express varying degrees of definite haemolysis up to fully haemolysed and are associated with the prior art salts which are less acceptable for injection.

Hitherto, the irritant properties of tetramisole salts, e.g. of the widely used tetramisole hydrochloride, have imposed limitations on the concentration of the drug which could be injected with the desired high degree of safety, and have necessitated compromises between the volume injected and the therapeutic dose administered. Thus for some species of worms, especially in the immature form, a higher dose rate is required for complete control. A higher does can, of course, be provided by a larger injection volume or by a higher concentration, but with the salts used hitherto in practice either of these alternatives exposes the tissues at the site of injection to higher risks of damage.

It is remarkable that the tetramisole salts used hitherto almost exclusively both for oral administration and injection, namely the hydrochloride and, to a much lesser extent, the acetate, are so much less acceptable for injection than the preferred salts according to this invention.

We have found that the tetramisole salts satisfying the haemolysis test, e.g. citric acid, tartaric acid and, particularly, phosphoric acid are therapeutically acceptable for injections; particularly acceptable and superior to all salts tested by us is the phosphoric acid salt and this is therefore most preferred. Accordingly we provide an aqueous solution of a tetramisole citrate, tartrate or phosphate equivalent to at least 6 percent w/v of tetramisole base. With polyprotic acids of suitable dissociation constants, mono- and di-tetramisole salts are acceptable but some of the di-tetramisole salts, e.g. di-tetramisole phosphate are fairly alkaline and would lead to aqueous formulations having a pH in excess of 5, e.g. in excess of the optimum desirable for storage in view of the hydrolytic instability of tetramisole at pH's in excess of 5; consequently the addition of excess therapeutically acceptable anion, e.g. tartaric or phosphoric acid, is advisable, unless prolonged storage is not required. Accordingly out most preferred aqueous compositions comprise tetramisole dihydrogen phosphate.

We have found furthermore that the solubility of L-tetramisole dihydrogen citrate, hydrogen tartrate and, particularly, L-tetramisole dihydrogen phosphate in water is extremely high and that our biological findings allow us to exploit this phenomenon in a new manner. In particular we have found that L-tetramisole dihydrogen phosphate is soluble at surprisingly high concentrations (in excess of 60 percent w/v at 0° C). Any reduction in the amount of injected fluid reduces sensitivity marginally; however, with the tetramisole salt formulations of the prior art a distinct increase in the incidence of irritation has been associated with an increase in the concentration of the salt in the injectable solutions. The tetramisole dihydrogen phosphate solutions, by contrast, have been shown by us to be particularly acceptable at higher concentrations. In addition there is some indication that the more concentrated phosphate salts exhibit improved therapeutic acceptability from the point of view of hyperaesthesia.

Accordingly we provide therapeutically acceptable injectable aqueous solutions comprising L-tetramisole dihydrogen phosphate at concentrations from 12.5 percent w/v up to the limit of its solubility at the desired storage temperature. We have prepared and successfully administered solutions comprising up to and in excess of 50 percent w/v of tetramisole dihydrogen phosphate.

Because L-tetramisole is therapeutically more acceptable than the racemate and is a more concentrated form of the active ingredient it can be administered in smaller amounts of injected fluid; our preferred salts are therefore based on L-tetramisole, but salts of the racemate are included.

We have found furthermore that any residual undesirable side effects of tetramisole addition salts can be further reduced by the addition of water soluble and therapeutically acceptable salts, particularly sodium salts and we have confirmed that the solutions so prepared are therapeutically more acceptable when injected into animals. The addition of these salts, especially of sodium salts, which is subject of our co-pending application of even date, may therefore be used as described in said application to render the less preferred prior art tetramisole solutions, e.g. tetramisole hydrochloride or tetramisole acetate solutions, more acceptable; they may also be used to provide yet a further, marginal but valuable improvement in the formulations of the preferred tetramisole salts of this invention such as tetramisole citrate, tartrate and, particularly the tetramisole phosphates. Suitable sodium salts are the salts of the anions which have been proved to be therapeutically more acceptable in the tetramisole salts themselves namely sodium citrate, sodium tartrate or sodium phosphate; again the sodium dihydrogen phosphates are more preferred and sodium dihydrogen phosphate is most preferred. Other, less practical salts are the magnesium and, in the low regions which are biologically permissible, potassium salts. Mixtures of suitable salts as defined may also be used. The monosodium salt is usually used although from the point of view of therapeutic and biological acceptability the more alkaline salts are not excluded; however, they are not practical because of storage requirements in view of the hydrolytic instability of tetramisole discussed above.

Accordingly we provide an aqueous injectable solution comprising a tetramisole salt as hereinbefore defined in a concentration equivalent to at least 6 percent w/v of free tetramisole base and, in addition, from 0.1 to 0.5 inclusive moles, preferably from 0.15 to 0.5 inclusive moles, of a water soluble sodium or potassium salt per liter of solution.

Whenever, as the result of the choice of a particular tetramisole salt or a particular sodium salt, the pH exceeds the optimum 4, the pH may be adjusted by the addition of an acid having a therapeutically acceptable anion, e.g. tartaric, citric or preferably phosphoric acid.

Accordingly we provide formulations as defined above wherein the pH is adjusted to the range from 2 to 4 by the addition of citric, tartaric or phosphoric acid.

We also provide a method of combatting helminthiasis in a warm-blooded animal which comprises injecting said animal with a tetramisole solution as hereinbefore defined.

Our invention is now exemplified by but not limited to the following examples, in which all proportions are given as the weight/volume equivalent to free tetramisole base, unless it is otherwise stated.

Examples 1 to 7 inclusive

Sterile aqueous solutions, suitable for injection were prepared from L-tetramisole dihydrogen phosphate, L-tetramisole hydrogen tartrate, L-tetramisole dihydrogen citrate, L-tetramisole acetate and L-tetramisole hydrochloride at the concentrations stated in Tables 1 and 2. In addition to these salts the following compounds which have been conventionally used in the prior-art-tetramisole formulations were added: 2 g sodium metabisulphite 0.5 g methyl para-oxybenzoate, 0.05 g propyl para-oxybenzoate per 1,000 mls of water.

From several large herds, cattle were selected which, during earlier trials, had shown sensitivity to tetramisole hydrochloride injections. This selection was necessary because the vast majority of animals shows no unfavorable reaction whatever to the injection of tetramisole and the incidence of sensitivity among normal cattle is so extremely low that very large numbers of cattle would need to be treated before any significant trends in irritation can be detected. It is known that quite generally the sensitivity to injections of any drug varies between animals and, even for a given animal, varies from site to site of injection; to eliminate or minimize these side effects different treatments were randomised over sites as well as animals, using pairing of identical left and right side sites as much as possible for randomisation. The sterile formulations were injected subcutaneously and the hair was shaved off the injection sites to facilitate observation.

Assessments of the tissue reaction, if any, at the site of injection were made regularly for a period of up to 14 days. The type of reaction at each site was rated as follows:

| | |
|---|---|
| 0 | No reaction |
| 1 | Mild skin thickening and slight swelling of the subcutaneous tissues, lower limit of detectability by palpation only. |
| 2 | Similar to rate 1 but slightly more extensive. |
| 4 | Swelling up to about 2" diameter visible, slightly raised above the body surface. |
| 8 | Large swelling up to 4" in diameter and raised about ¼ to 1" above body level. |
| 16 | Larger swelling than 8. |

The exponential increase in the rating values takes into account the increasing extent of the irritation. Ratings 0 to 4 inclusive, without shaving off the hair, would pass unnoticed in practice but ratings 8 and above are noticeable and are undesirable; rating 16 is unacceptable.

Because a large number of treatments at one time cannot be satisfactorily paired and randomised with a manageable number of animals, and also to obtain an indication of random variation due to climatic, biological (age, physical conditions, sex) and other chance factors, several blocks of experiments were carried out and are reported here in separate tables. The sum of the ratings of the animals in each group (total rating) divided by the number of animals gave the parameter rate/beast, which is an inverse expression of the acceptability of the injectable formulation. Rates below 4.0 are satisfactory, below 2.0 good, and below 1.5 excellent. All figures given in the tables were statistically significant at the 1 in 100 level or better.

At the same time haemolysis tests were carried out as above described to determine the correlation between the haemolysis and the acceptability, the rate/beast figure.

Results of experiments 1 to 7 inclusive are given in Tables 1 and 2; each table resulted from a separate block of experiments. Experiments 1 to 4 are according to this invention, experiments 5 to 7 are according to the prior art.

Since, at conventional concentrations of L-tetramisole hydrochloride (6.38 percent w/v expressed as free base) even with selected sensitive test animals, the incidence of irritation is too rare to be demonstrated in anything but very large-scale trials, the concentration of L-tetramisole hydrochloride and acetate was increased (to 12.75 percent w/v expressed as free base) to increase sensitivity.

Examples 8 to 15

With prior art formulations it has been found that sensitivity increases with increasing concentration of the tetramisole salt, yet higher concentrations are desirable for greater ease of administration and efficacy against certain resistant strains of infestations.

To compare the increase in incidence of irritation with prior art formulations and with the formulations of the present invention, two series of experiments using progressively higher concentrations of L-tetramisole were carried out in the manner described in Examples 1 to 7 inclusive. Results, given in Tables 3 and 4, show that, with the prior art formulations of Table 3, using again selected animals of a known, relatively high sensitivity, the upper concentration limits at which acceptability was excellent were exceeded rapidly; under identical conditions the formulations according to the present invention of Table 4, by contrast, established no upper limit of acceptability, even at more than 5 times the concentration of the prior art formulations hitherto employed in practice. Thus, Table 4 demonstrates the excellent acceptability of the dihydrogen phosphate salt at very high concentrations.

TABLE 3

| Exp. No. | L-tetramisole salt | Concentration (expressed as percent w./v. free base) | No. of beasts | Rate/ beast |
|---|---|---|---|---|
| 8 | Hydrochloride (prior art) | 15 | 36 | 5.3 |
| 9 | do | 10 | 31 | 4.1 |
| 10 | do | 7.5 | 14 | 2.0 |

TABLE 4

| Exp. No. | L-tetramisole salt | Concentration (expressed as percent w./v. free base) | No. of beasts | Rate/ beast |
|---|---|---|---|---|
| 11 | Dihydrogen phosphate | 42.3 | 2 | 1.5 |
| 12 | do | 28.2 | 2 | 1.5 |
| 13 | do | 21.15 | 2 | 1.5 |
| 14 | do | 14.1 | 2 | 1.5 |
| 15 | do | 10.5 | 2 | 0.5 |

Examples 16 to 18 inclusive

A further series of injections was carried out as described in Examples 1 to 7, but in addition to the L-tetramisole dihydrogenphosphate a sodium salt was incorporated in the injected solution (Exp. 17 and 18). Exp. 16 is a control according to this invention, but without the sodium salt.

Results given in Table 5 show that a further highly desirable repression of the irritation rate/beast was attained.

TABLE 5

| Experiment No. | L-tetramisole salt | Concentration (expressed as percent w./v. free base) | Additive and concentration, percent w./v. | No. of beasts | Rate/ beast |
|---|---|---|---|---|---|
| 16 | Dihydrogen phosphate | 15.3 (=0.75 mol) | Nil—control | 24 | 1.83 |
| 17 | do | | $Na_2SO_4$, 1.5% (=0.11 mol) | 19 | 1.0 |
| 18 | do | | $NaH_2PO_4 \cdot 2H_2O$, 3.3% (=0.21 mol) | 19 | 0.63 |

TABLE 1

| Experiment No. | L-tetramisole salt | Concentration (expressed as percent w./v. free base) | Rating 8 | Rating 4 | Rating 2 | Rating 1 | Rating 0 | No. of injections | Total rating | Rate/ beast | Haemolysis test rating |
|---|---|---|---|---|---|---|---|---|---|---|---|
| 1 | Dihydrogen phosphate | 12.75 | | | 1 | 6 | 2 | 9 | 8 | 0.89 | 0 |
| 2 | Dihydrogen citrate | 12.75 | | 1 | 5 | 2 | 1 | 9 | 16 | 1.78 | 0 |
| 3 | Hydrogen tartrate | 12.75 | 1 | 1 | 0 | 4 | 3 | 9 | 16 | 1.78 | 0 |

TABLE 2

| Experiment No. | L-tetramisole salt | Concentration (expressed as percent w./v. free base) | Rating 16 | Rating 8 | Rating 4 | Rating 2 | Rating 1 | Rating 0 | No. of injections | Total rating | Rate/ beast | Haemolysis test rating |
|---|---|---|---|---|---|---|---|---|---|---|---|---|
| 4 | Dihydrogen phosphate | 12.75 | | | | 5 | 4 | 19 | 8 | 36 | 47 | 1.31 | 0 |
| 5 | Hydrogen sulphate (prior art) | 12.75 | 1 | 6 | 16 | 11 | 2 | 0 | 36 | 152 | 4.2 | 3-4 |
| 6 | Hydrochloride (prior art) | 12.75 | 3 | 7 | 19 | 7 | | | 36 | 194 | 5.3 | 10 |
| 7 | Acetate (prior art) | 12.75 | 1 | 12 | 11 | 6 | 6 | | 36 | 174 | 4.8 | 10 |

Examples 19 and 20

The test animals of experiment 1 to 18 which had been selected because of their higher sensitivity were replaced by a normal herd. These animals were injected with L-tetramisole dihydrogenphosphate solutions as described in Examples 1 to 7, using the concentrations stated in Table 6. The complete suppression of irritation, tantamount to freedom from undesirable reaction is apparent from the low rates/beast observed. These examples are representative of the reaction of normal cattle under field conditions.

TABLE 6

| Exp. No. | Formulation | Concentration (expressed as percent w./v. free base) | No. of beasts | Rate/ beast |
|---|---|---|---|---|
| 19 | L-tetramisole dihydrogen phosphate. | 12.75 | 94 | 0.18 |
| 20 | L-tetramisole dihydrogen phosphate plus 2.0% w./v. $NaH_2PO_4$ (0.167 mol). | 12.75 | 94 | 0.03 |

Examples 21 and 22

A further series of tests was carried out with a normal herd as described in Examples 19 and 20 using high concentrations of both tetramisole salt and sodium salt. Results in Table 7 show excellent acceptability in all instances.

TABLE 7

| Exp. No. | Formulation | Tetramisole concentration (expressed as percent w./v. free base) | No. of beasts | Rate/ beast |
|---|---|---|---|---|
| 21 | L-tetramisole dihydrogen phosphate plus 2.54% w./v. $NaH_2PO_4$ (0.212 mole). | 15.3 | 40 | 0.5 |
| 22 | L-tetramisole dihydrogen phosphate plus 5.08% w./v. $NaH_2PO_4$ (0.424 mole). | 30.6 | 40 | 0.7 |

Examples 23 – 25

Examples 19 and 20 were performed on cattle grazing in areas of southern Australia which has a temperate climate. In the present example tests were made on herds of cattle in various areas of Queensland having climates ranging from subtropical to tropical. The animals were injected with L-tetramisole dihydrogen phosphate solutions prepared as in Example 1. The solutions contained in addition 0.071 mole of sodium dihydrogen citrate and 0.142 mole of sodium dihydrogen phosphate dihydrate. The pH of the solutions was adjusted to a pH of 3.5 by the addition of small amounts of phosphoric acid. The various concentrations of L-tetramisole dihydrogen phosphate used, the total number of beasts tested and the rate per beast are set out in Table 8. The results of Table 8 demonstrate the excellent acceptability of the dihydrogen phosphate salt in the presence of sodium dihydrogen citrate under the more arduous climatic conditions of Queensland.

TABLE 8

| Exp. No. | L-tetramisole salt | Concentration (expressed as percent w./v. free base) | No. of beasts | Rate/ beast |
|---|---|---|---|---|
| 23 | Dihydrogen phosphate | 6.36 | 195 | 0.62 |
| 24 | do | 11.6 | 318 | 1.26 |
| 25 | do | 17.4 | 143 | 1.49 |

Example 26

20 mixed cross-bred dairy type calves of weights varying from 115 to 206 lb. were injected with two solutions (a) and (b) as described hereunder at the rate of 1 ml of solution per 40 lb. of bodyweight. The solutions were prepared as in Example 1 but contained L-tetramisole dihydrogen phosphate equivalent to 11.6 percent w/v of free base. The solutions were adjusted to a pH of 3.5 by the addition of phosphoric acid and contained in addition 0.212 mole per liter of sodium dihydrogen citrate in solution (a) and 0.424 mole per liter of sodium dihydrogen citrate in solution (b). For each beast solution (a) was injected on one side and solution (b) on the other side. After 14 days the rate per beast was 0.45 for solution (a) and Nil for solution (b). This example demonstrates the effect of increased concentration of water soluble sodium salts in the formulation.

Example 27

24 cattle taken from a normal herd were injected with L-tetramisole dihydrogen phosphate solutions as described in Examples 1 to 7. The concentration of L-tetramisole dihydrogen phosphate was 17.3 percent w/v expressed as free base. The solution contained 0.212 mole per liter of sodium dihydrogen phosphate and was adjusted to pH 3.5 by the addition of phosphoric acid. The rate per beast was 2.6.

Example 28

Example 27 was repeated but the sodium dihydrogen phosphate of that example was replaced by 0.212 mole per liter of potassium dihydrogen phosphate. The rate per beast was 2.2.

Example 29

12 cattle were injected with a solution prepared by the method of examples 1 to 7. The formulation was L-tetramisole citrate having a tetramisole concentration of 15.3 percent w/v expressed as free base plus 0.212 mole/liter of $Na\,H_2\,PO_4\,2H_2O$. The pH of the formulation was adjusted to 3.5 by the addition of citric acid. The rate per beast was 3.9.

Example 30

12 cattle were injected with a solution prepared by the method of examples 1 to 7. The formulation was L-tetramisole tartrate having a tetramisole concentration of 15.3 percent w/v expressed as free base plus 0.212 mole/liter of $Na\,H_2\,PO_4\,2H_2O$. The pH of the formulation was adjusted to 3.5 by the addition of tartaric acid. The rate per beast was 2.7.

We claim:

1. An aqueous solution, which is therapeutically acceptable to warm blooded animals by injection, said solution comprising tetramisole citrate, tartrate or phosphate equivalent to at least 6 percent w/v of L-tetramisole base, the pH of the solution being adjusted to the range of from 2 to 4 by addition of citric, tartaric or phosphoric acid.

2. An aqueous solution according to claim 1 wherein the tetramisole phosphate is L-tetramisole dihydrogen phosphate.

3. An aqueous solution according to claim 2 comprising L-tetramisole dihydrogen phosphate at concentrations from 12.5 w/v to the limit of its solubility at the desired storage temperature.

4. An aqueous solution according to claim 2 comprising L-tetramisole dihydrogen phosphate, at concentrations in the range from 12.5 percent w/v to 23 percent w/v inclusive.

5. An aqueous solution according to claim 1 comprising from 0.1 to 0.5 inclusive mole per liter of solution of a salt selected from the group consisting of a sodium or potassium salt of citric, tartaric or phosphoric acid.

6. A method of combating helminthiasis in a warm blooded animal which method comprises injecting said animal with an effective amount of a solution according to claim 1.

7. A method of combating helminthiasis in a warm blooded animal which method comprises injecting said animal with an effective amount of a solution according to claim 2.

8. A method of combating helminthiasis in a warm blooded animal which method comprises injecting said animal with an effective amount of a solution according to claim 5.

* * * * *